INVENTOR
RAYMOND P. SULLIVAN

BY Richard S. Shreve, jr.
ATTORNEY

United States Patent Office 2,957,977
Patented Oct. 25, 1960

2,957,977

PILOT ARC SPOT WELDING

Raymond P. Sullivan, Jersey City, N.J., assignor to Union Carbide Corporation, a corporation of New York Filed July 23, 1957, Ser. No. 673,613

7 Claims. (Cl. 219—127)

This invention relates to the use of a high-pressure pilot arc for starting in gas shielded arc working operations. It is particularly useful in mechanized spot-welding operations wherein the work to be spot-welded is continuously fed or indexed under the torch.

The conventional methods of initiating the welding operations consist of the use of a high-frequency pilot arc, and scratch or retract starting wherein the electrode is brought into contact with the work. The use of the high-frequency pilot arc for welding arc initiation has numerous disadvantages, high-frequency radiation, potential shock hazard, and complication of torch design being but a few. In scratch or retract starting there is the disadvantage of possible weld contamination due to the deposit of minute particles of the refractory electrode on the workpiece.

The main objects of the present invention are to eliminate the above disadvantages, and to provide a substantially constant electrode dimension thereby maintaining a constant electrode-to-workpiece distance necessary in most mechanized spot-welding applications.

In its simplest form, according to the invention, a high-pressure pilot arc is maintained between an electrode and a workpiece as a very low current arc. Thus, once ignited, the torch can be moved slowly over the workpiece and the pilot flame will follow to the point where the next weld is to be made or, conversely, the work can be moved slowly beneath it. This form of pilot arc starting is unique in that it has no auxiliary electrode in the sense of the usual gas cup auxiliary electrode.

Another form of the invention uses an electrical shunt, a solid sheet of copper in its preferred form. This shunt is electrically connected into the circuit so that it becomes the auxiliary electrode of the pilot arc and moves between the electrode and the work. In this way, the heat of the pilot arc is absorbed in the copper shunt and not in the work.

Figure 1:
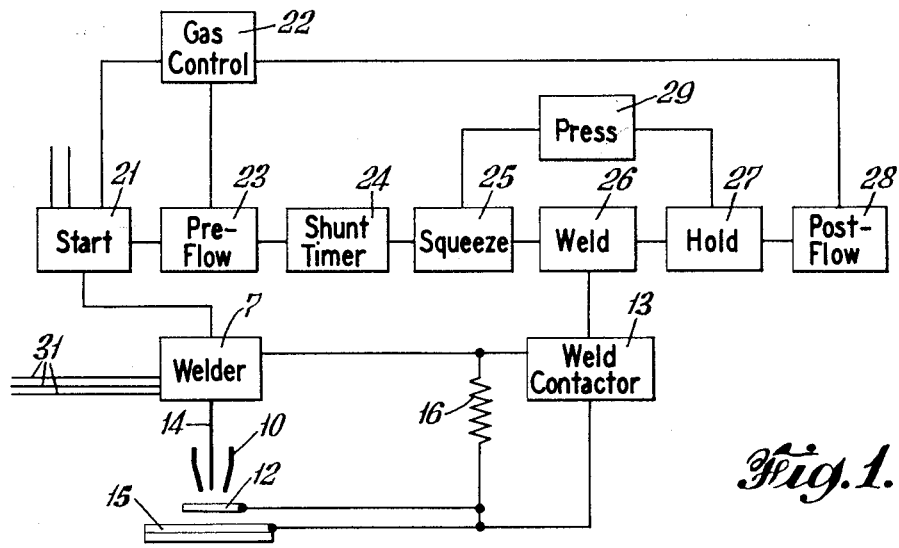
Figure 1 is a block diagram of the welding circuit for transferred high-pressure pilot arc starting using the electrical shunt.

Referring more particularly to the drawings, a shunt 12 is mounted to slide between the rim of the torch cup 10 and the workpiece 15 to be spot-welded. Switch 13 operates to short circuit the resistor 16 and is connected by conductor 20 to both the work and the shunt 12.

In operation, the transferred high-pressure pilot arc would first exist between the end of the electrode 14 and the copper shunt 12. It should be noted that the clearance (X) between the gas cup 10 and the shunt 12 is not of consequence and need only be sufficient for mechanical purposes. Should the cup 10 and the shunt 12 come in accidental contact, there will be no electrical effect. It should be further noted that assuming the end of the electrode 14 to be flush with the bottom of the cup 10, the clearance (X) plus the shunt thickness (Y) establish the minimum electrode-to-work distance. When it is desired to make a spot-weld the shunt is removed and the pilot arc is transferred to the work, the switch is then closed. The main arc is then formed between the electrode 14 and the work 15.

At the end of the welding cycle, switch 13 is opened and the shunt 12 slides back between the work 15 and the electrode 14 so that the pilot arc is again maintained between the electrode and the shunt 12. It is important to note that the shunt and work are connected together electrically by conductor 11. The power supply 17 is a conventional D.C. welding power supply and resistor 16 limits the pilot arc current.

Figure 2:
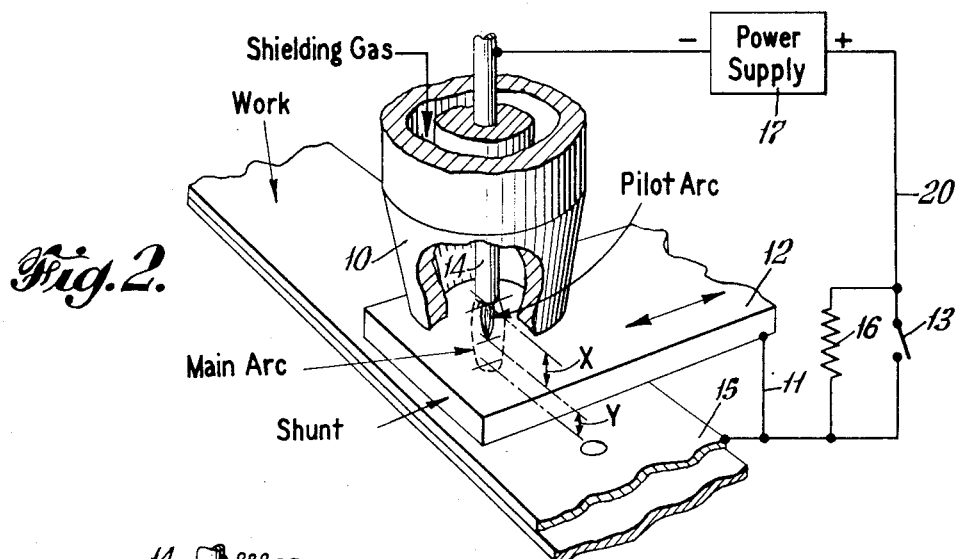
Figure 2 shows a perspective view, with parts broken away and shown in section, of an inert gas-shielded refractory electrode arc spot-welding set-up illustrating the invention.
Figure 3:
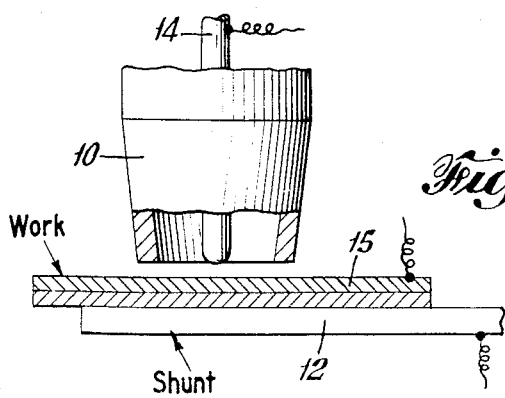
Figure 3 is a vertical sectional view of a modification.

An additional variation of the electrical shunt system is shown in Fig. 3 and consists of changing the position of the workpiece and shunt sheet from that shown in Figure 2. That is, the shunt is fixed and, as before, the pilot arc is maintained between the electrode and the shunt. When it is desired to make a spot-weld, the work is inserted between the shunt and the electrode and the pilot arc is transferred to the work. At the same instant the switch is closed and the welding arc forms between the work and the electrode. Again at the end of the cycle the switch opens, interrupting the main arc welding current, and the pilot arc again exists between the electrode and the work. At the same instant the work is removed transferring the pilot arc back to the shunt sheet beneath it.

The operation of the circuit shown in Fig. 1 is as follows: The starting circuit, 21, supplied from a 110 volt A.C. circuit, energizes the primary contactor of the welding power supply 7, which in turn is supplied by a 440/220 volt A.C. circuit 31. Also actuated from the starting circuit 21 is the gas control 22 so that at least 3 c.f.h. of argon gas is flowing to maintain the pilot arc. The pilot arc is then struck manually between electrode 14 and shunt 12. The sequence is then started by the pre-flow timer 23. This timer 23 activates the gas control 22 so as to increase the shielding gas flow to a rate suitable for welding. Simultaneously the shunt timer 24 is activated, thereby removing the shunt 12 from between the electrode 14 and the work 15. The pilot arc is now maintained between electrode 14 and work 15.

The squeeze timer 25 is actuated and in turn operates the press fixture 29 to press the torch gas cup 10 against the work 15. At the end of the squeeze time the weld timer 26 is started, thereby closing the weld contactor 13 which completes the main welding circuit. Upon completion of the welding cycle as governed by the weld timer 26, the hold timer 27 maintains a post-welding pressure against the workpiece 15, and then in turn operates the press fixture 29 to release the gas cup 10 pressure on the work 15.

Simultaneously with the action of the hold timer 27, the post-flow timer 28 is actuated; and upon completion of its cycle, it actuates the gas control 22 so as to reduce the gas flow back to the idling flow (3 c.f.h. minimum). At such time as the hold timer 27 has allowed the press fixture 29 to raise off the work 15 so as to allow clearance for the shunt 12, the shunt timer 24 actuates to bring the shunt 12 between electrode 14 and work 15. The pilot arc is now maintained between electrode 14 and shunt 12. In the event that the shunt 12 is mechanically connected to the torch, then the torch could raise or lower to any practical distances to allow for work 15 positioning.

What is claimed is:

1. Method of gas shielded arc torch spot welding which comprises striking a high pressure pilot arc between a torch electrode and a shunt interposed between the electrode and the workpiece, removing the shunt to transfer the pilot arc from the shunt and to the workpiece, superimposing welding current upon the pilot arc to form a main arc and effect the spot weld, and removing the welding current and replacing the shunt to restore the pilot arc in the shunt.

2. Apparatus for gas shielded arc torch spot welding which comprises means for striking a high pressure pilot arc between the torch electrode and a shunt positioned adjacent the workpiece, said shunt being removable to transfer the pilot arc to the workpiece and segregate said shunt from the welding circuit, means for superimposing welding current upon the pilot arc to form a main arc and effect the spot weld, said shunt being replaceable and the welding current being removed to restore the pilot arc to the shunt.

3. Method of gas shielded arc torch welding which comprises striking a high pressure pilot arc between a torch electrode and shunt positioned in spaced relation thereto, interrupting the spaced relationship between electrode and shunt and transferring the pilot arc to a workpiece, simultaneously superimposing a welding current upon the pilot arc to form a welding arc, relatively moving the electrode to form a weld, on completion of the weld, removing the welding current to extinguish the welding arc while maintaining the pilot arc and re-establishing the spaced relationship between electrode and shunt.

4. Method of gas shielded arc torch spot welding which comprises striking a high pressure pilot arc between a torch electrode and a shunt spaced therefrom, positioning a workpiece in the space intermediate said electrode and shunt to transfer the pilot arc to the workpiece, superimposing a welding current on said pilot arc to form a main arc and effect a weld in the workpiece, after effecting said weld removing the welding current and then displacing the workpiece to re-establish the pilot arc between the electrode and shunt.

5. Method of gas shielded arc torch spot welding which comprises striking a high pressure pilot arc between a torch electrode and a shunt positioned in spaced relation thereto interrupting said spaced relation and superimposing welding current upon the pilot arc to form a welding arc, after forming the weld, interrupting said spaced relation, removing the welding current to extinguish the welding arc, and repositioning the shunt to re-establish the pilot arc.

6. Apparatus for gas shielded arc torch spot welding which comprises means for striking a high pressure pilot arc between the torch electrode and a shunt positioned in spaced relation thereto, means for interrupting said spaced relationship to remove the pilot arc to a workpiece, means for superimposing welding current upon the pilot arc to form a main welding arc for effecting a spot weld on the workpiece, and means for removing the welding current to extinguish the main arc and re-establish the pilot arc on the shunt.

7. Apparatus for gas shielded arc torch spot welding which comprises means for striking a high pressure pilot arc between the torch electrode and a shunt positioned in fixed relation to accommodate a workpiece therebetween, means for transferring the pilot arc to a workpiece for forming a weld, means for superimposing welding current upon the pilot arc to form a main welding arc and effect a spot weld, and means for removing the welding current to extinguish the main arc and re-establish the pilot arc on the shunt.

References Cited in the file of this patent
UNITED STATES PATENTS

| | | |
|---|---|---|
| 1,002,721 | Mathers | Sept. 5, 1911 |
| 1,616,145 | Shipman | Feb. 1, 1927 |
| 2,516,016 | Pakala | July 18, 1950 |
| 2,516,037 | Williams | July 18, 1951 |
| 2,682,598 | Macoy | June 29, 1954 |
| 2,798,937 | Miller | July 9, 1957 |
| 2,802,093 | Gage | Aug. 6, 1957 |